United States Patent
Wu et al.

(10) Patent No.: US 12,388,609 B2
(45) Date of Patent: Aug. 12, 2025

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventors: Zhikun Wu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 421 days.

(21) Appl. No.: 17/921,126

(22) PCT Filed: May 26, 2021

(86) PCT No.: PCT/CN2021/095921
§ 371 (c)(1),
(2) Date: Oct. 25, 2022

(87) PCT Pub. No.: WO2021/244359
PCT Pub. Date: Dec. 9, 2021

(65) Prior Publication Data
US 2023/0179376 A1    Jun. 8, 2023

(30) Foreign Application Priority Data
Jun. 2, 2020  (CN) .......................... 202010489331.1

(51) Int. Cl.
*H04L 5/00*  (2006.01)
*H04L 1/1812*  (2023.01)
*H04W 72/40*  (2023.01)

(52) U.S. Cl.
CPC .......... *H04L 5/0055* (2013.01); *H04L 1/1812* (2013.01); *H04L 5/0007* (2013.01); *H04W 72/40* (2023.01)

(58) Field of Classification Search
CPC ... H04L 5/0055; H04L 1/1812; H04L 5/0007; H04L 1/1854; H04L 1/1861;
(Continued)

(56) References Cited

U.S. PATENT DOCUMENTS

2020/0099479 A1*  3/2020  Park ........................ H04W 4/70
2020/0266857 A1*  8/2020  Hwang .................. H04L 1/1864
(Continued)

FOREIGN PATENT DOCUMENTS

CN  109792326 A  5/2019
CN  110311762 A  10/2019
(Continued)

OTHER PUBLICATIONS

International Search Report and Written Opinion mailed on Aug. 18, 2021, received for PCT Application PCT/CN2021/095921, filed on May 26, 2021, 8 pages including English Translation.

*Primary Examiner* — Afshawn M Towfighi
(74) *Attorney, Agent, or Firm* — XSENSUS LLP (57) ABSTRACT

Provided in the present disclosure are an electronic device and method for wireless communication, and a computer-readable storage medium. The electronic device comprises: a processing circuit, which is configured to: provide configuration information to a receiving terminal device in sidelink communication, the configuration information being used to configure an additional physical sidelink feedback channel (PSFCH) resource that is used by the receiving terminal device to send a hybrid automatic repeat request (HARQ)) feedback, the additional PSFCH resource being a resource other than a PSFCH resource that is already configured and that is pool-specific; and acquire the HARQ feedback from the receiving terminal device on the basis of the configuration information.

25 Claims, 8 Drawing Sheets

(58) Field of Classification Search
CPC ... H04L 1/1896; H04L 5/0094; H04L 1/1607; H04W 72/40; H04W 24/02; H04W 72/0453
See application file for complete search history.

(56) References Cited

U.S. PATENT DOCUMENTS

| | | | | |
|---|---|---|---|---|
| 2022/0103292 | A1* | 3/2022 | Hwang | H04L 1/1812 |
| 2022/0150872 | A1* | 5/2022 | Park | H04L 1/08 |
| 2022/0232620 | A1* | 7/2022 | Lee | H04L 1/1867 |
| 2023/0050839 | A1* | 2/2023 | Lee | H04L 1/1685 |

FOREIGN PATENT DOCUMENTS

| | | |
|---|---|---|
| CN | 110545533 A | 12/2019 |
| CN | 110943809 A | 3/2020 |
| KR | 10-2020-0034924 A | 4/2020 |

\* cited by examiner

| Element | Meaning |
|---|---|
| 00 | No additional PSFCH resources are configured |
| 01 | Additional PSFCH resources are configured and the pattern of Figure 6 is used |
| 10 | Additional PSFCH resources are configured and the pattern of Figure 7 is used |

ELECTRONIC DEVICE AND METHOD FOR WIRELESS COMMUNICATION, AND COMPUTER-READABLE STORAGE MEDIUM

CROSS-REFERENCE TO RELATED APPLICATIONS

The present application is based on PCT filing PCT/CN2021/095921, filed May 26, 2021, which claims priority to Chinese Patent Application No. 202010489331.1, titled "ELECTRONIC DEVICE AND METHOD FOR WIRELESS COMMUNICATION, AND COMPUTER-READABLE STORAGE MEDIUM", filed on Jun. 2, 2020 with the China National Intellectual Property Administration, the entire contents of each are incorporated herein by reference in its entirety.

FIELD

The present disclosure relates to the technical field of wireless communications, and in particular to Hybrid Automatic Retransmission request (HARQ) feedback technology in sidelink (SL) communications. More particularly, the present disclosure relates to an electronic apparatus and a method for wireless communications, and a computer-readable storage medium.

BACKGROUND

In V2X discussion of R16 version, a Physical Sidelink Feedback Channel (PSFCH) is introduced for transmitting an HARQ feedback to a transmitting terminal device by a receiving terminal device (such as user equipment (UE)). Time-frequency resources that the PSFCH can occupy depend on a relevant configuration of a communication resource pool, that is, current resources of the PSFCH are pool-specific. For example, available resources for the PSFCH may be provided at a certain time-domain period, and the HARQ feedback may be performed on these available resources for the PSFCH.

According to this scheme, occupation of resources for the HARQ feedback may be significantly reduced, and different kinds of services may be supported by changing the relevant configuration of the communication resource pool. In other words, various different resource pools may be configured, and the different resource pools may be configured, for example, with available resources for the PSFCH provided at different periods, so as to support different kinds of services. However, related signaling overhead and complexity at a UE side may be increased:

In addition, due to the periodicity of the available resources for the PSFCH, latency of the HARQ feedback may be great, and thus requirements of some low-latency services are difficult to be satisfied.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry configured to: provide configuration information to a receiving terminal device in a sidelink communication, the configuration information being used for configuring additional physical sidelink feedback channel (PSFCH) resources for transmitting hybrid automatic retransmission request (HARQ) feedback by the receiving terminal device, where the additional PSFCH resources are resources other than pool-specific PSFCH resources which are already configured; and acquire, based on the configuration information, the HARQ feedback from the receiving terminal device.

According to an aspect of the present disclosure, a method for wireless communications is provided. The method includes: providing configuration information to a receiving terminal device in a sidelink communication, the configuration information being used for configuring additional physical sidelink feedback channel (PSFCH) resources for transmitting hybrid automatic retransmission request (HARQ) feedback by the receiving terminal device, where the additional PSFCH resources are resources other than pool-specific PSFCH resources which are already configured; and acquiring, based on the configuration information, the HARQ feedback from the receiving terminal device.

According to another aspect of the present disclosure, an electronic apparatus for wireless communications is provided. The electronic apparatus includes processing circuitry configured to: acquire configuration information from a transmitting terminal device in a sidelink communication, the configuration information being used for configuring additional physical sidelink feedback channel (PSFCH) resources for transmitting hybrid automatic retransmission request (HARQ) feedback by a receiving terminal device, where the additional PSFCH resources are resources other than pool-specific PSFCH resources which are already configured, and transmit, based on the configuration information, the HARQ feedback to the transmitting terminal device.

According to another aspect of the present disclosure, a method for wireless communications is provided. The method includes: acquiring configuration information from a transmitting terminal device in a sidelink communication, the configuration information being used for configuring additional physical sidelink feedback channel (PSFCH) resources for transmitting hybrid automatic retransmission request (HARQ) feedback by a receiving terminal device, where the additional PSFCH resources are resources other than pool-specific PSFCH resources which are already configured; and transmitting, based on the configuration information, the HARQ feedback to the transmitting terminal device.

With the electronic apparatus and the method according to embodiments of the present disclosure, the additional PSFCH resources are configured for the HARQ feedback, so that latency of the HARQ feedback can be significantly decreased and requirements on latency of services can be better satisfied.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent from the following detailed description of preferred embodiments of the present disclosure in conjunction with the accompanying drawings.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
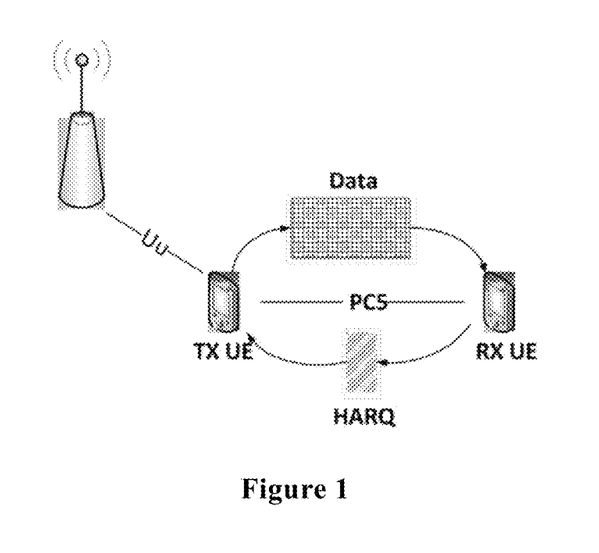
FIG. 1 shows an example of a scenario of a sidelink communication.

FIG. 1 shows an example of a scenario of a sidelink communication. Data is transmitted between a transmitting terminal device (TX UE) and a receiving terminal device (RX UE) through a PC5 interface of a sidelink, and the RX UE transmits HARQ feedback to the TX UE, In the example of FIG. 1, the TX UE communicates with a base station through a Uu interface.

As mentioned above, it is difficult to realize HARQ feedback that is efficient and universal to all services with an existing PSFCH resource configuration manner. In view of this, a solution that implements service-specific or terminal-specific HARQ feedback by configuring additional PSFCH resources is provided according to embodiments of the present embodiment, so as to improve flexibility and efficiency of the HARQ feedback.

It should be understood that although V2X is shown as an exemplary scenario in the above description, the present disclosure is not limited thereto, and may be applied to any scenario of a sidelink communication.

Figure 2:
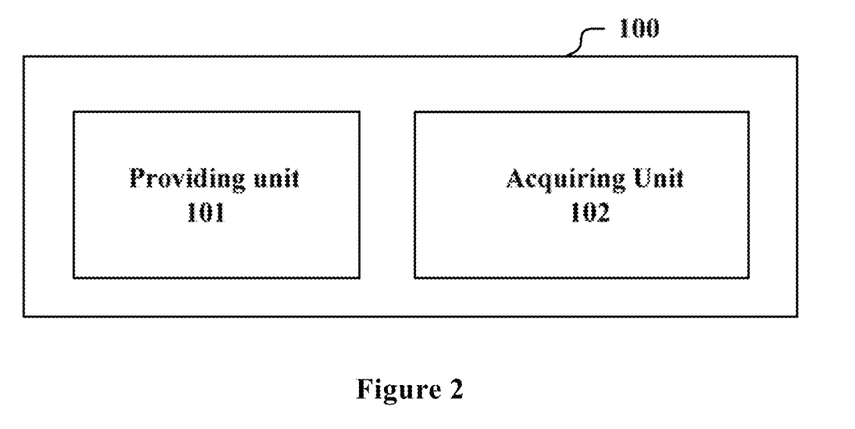
FIG. 2 shows a block diagram showing functional modules of an electronic apparatus for wireless communications according to an embodiment of the present disclosure.

FIG. 2 shows a block diagram of functional modules of an electronic apparatus 100 for wireless communications according to an embodiment of the present disclosure. As shown in FIG. 2, the electronic apparatus 100 includes a providing unit 101 and an acquiring unit 102. The providing unit 101 is configured to provide configuration information to a receiving terminal device in a sidelink communication. The configuration information is used for configuring additional physical sidelink feedback channel (PSFCH) resources for transmitting hybrid automatic retransmission request (HARQ) feedback by the receiving terminal device, where the additional PSFCH resources are resources other than pool-specific PSFCH resources which are already configured. The acquiring unit 102 is configured to acquire, based on the configuration information, the HARQ feedback from the receiving terminal device.

The providing unit 101 and the acquiring unit 102 may be implemented by one or more processing circuits. The processing circuits may be implemented as, for example, a chip. Moreover, it should be understood that various functional units in the apparatus shown in FIG. 1 are only logical modules divided based on their specific functions, and are not intended to limit a specific implementation.

The electronic apparatus 100 may be arranged on a side of a transmitting terminal device or may be communicatively connected to the transmitting terminal device, for example. Here, it should be noted that the electronic apparatus 100 may be implemented in a chip level, or in an apparatus level. For example, the electronic apparatus 100 may operate as the terminal device itself, and may further include external devices such as a memory and a transceiver (not shown). The memory may be configured to store programs required to be executed by the terminal device to implement various functions, and related data information. The transceiver may include one or more communication interfaces to support communications with various devices (a base station, other terminal devices, and the like), and implementations of the transceiver are not particularly limited herein.

In some of the description herein, the UE is taken as an example of a terminal device. However, the terminal device is not limited to the UE, but may be a relay network node, or the like.

Figure 3:
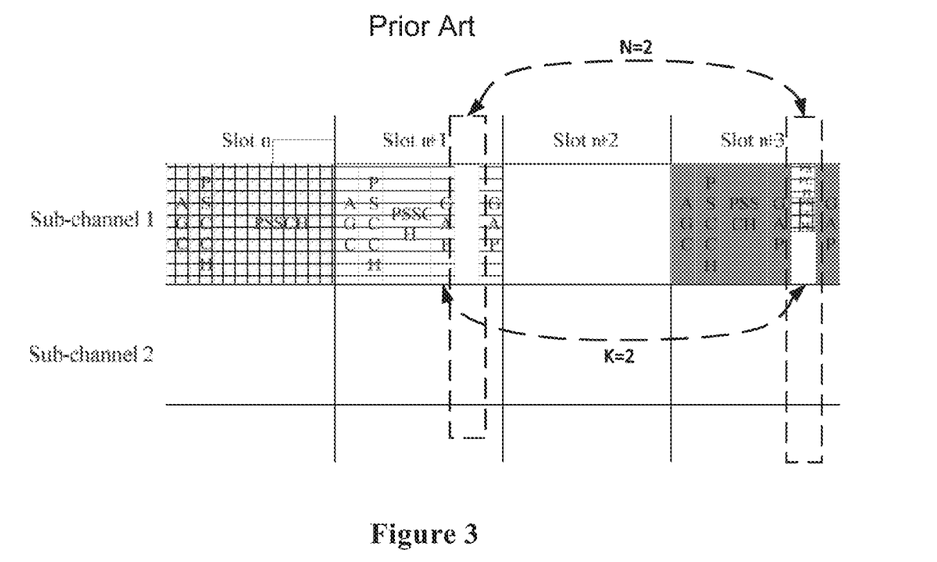
FIG. 3 shows a schematic diagram of a process of HARQ feedback in the sidelink communication according to the prior art.

FIG. 3 shows a schematic diagram of a process of HARQ feedback in the sidelink communication according to the prior an. In the example shown in FIG. 3, the TX UE transmits data to the RX UE through Physical Sidelink Control Channel (PSSCH) and Physical Sidelink Shared Channel (PSSCH) in the time slot n. It is assumed that PSFCH resources have a period N of 2 time slots, that is, available PSFCH resources are set every two time slots. In addition, it is assumed that a minimum latency K of the HARQ feedback is 2 slots. That is, upon receiving PSSCH data, the RX UE is required to wait for at least K time slots, and then feedbacks an HARQ until a next PSFCH resource appears. It can be seen that the timing between the PSSCH and the HARQ feedback is jointly determined by the period N of the PSFCH resources and the minimum latency K of the HARQ feedback required by a service.

It should be noted that the time slot described here is a logical time slat rather than a physical time slot. The logical time slot refers to a slot on resources allocated to the sidelink communication. Since these resources may not be physically continuous, a logical slot interval is not the same as a physical slot interval. For example, assuming that 20 time slots, each of which is a physical time slot, are configured in a frame of a communication system, where half of the slots, such as all even-numbered time slots, are allocated to the sidelink communication, for Slot 2 and Slot 4 for example, the physical slot interval therebetween is 2 time slots, and the logical slot interval is 1 time slot. The time slots shown in FIG. 3 are logical time slots.

As shown in FIG. 3, the TX UE transmits data in slot n, and the RX UE checks the nearest PSFCH resources at a timing of slot n+K, that is, slot n+2. For example, the nearest PSFCH resources are located in slot n+3, and then the RX UE transmits the HARQ feedback by using the PSFCH resources located in slot n+3. It should be noted that although there exist PSFCH resources in slot n+1, the RX UE cannot transmit the HARQ feedback by using such PSFCH resources and is required to wait for one period of the PSFCH resources. This is because the slot n+1 is prior to slot n+2. Specifically, the RX UE determines, based on an index of a starting sub-channel of the PSSCH and a corresponding time slot n, a position of resources in the frequency domain occupied by the PSFCH to be transmitted, such as on PRB z, and transmits the HARQ feedback on the PRB z.

It can be seen that the latency of the HARQ feedback is restricted by N and K. In order to decrease the latency, additional PSFCH resources for transmitting the HARQ feedback are configured according to the embodiment. Thereby, for services having strict requirements on latency, the receiving terminal device can use the additional PSFCH resources to quickly feedback the HARQ.

Figure 4:
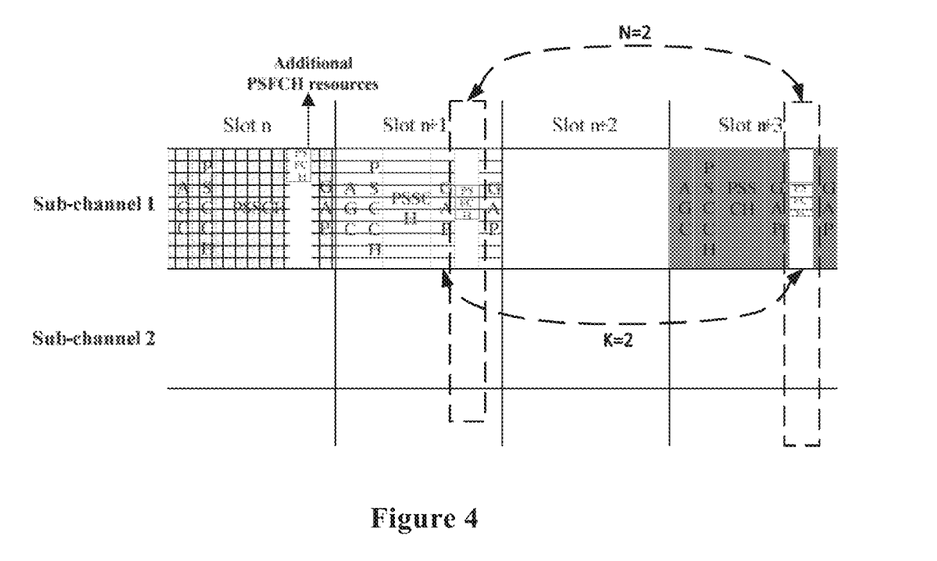
FIG. 4 shows a schematic diagram of a process of HARQ feedback in a case that additional PSFCH resources are configured.

For example, the additional PSFCH resources may be located within a same time slot in the time domain as resources of associated PSSCH transmitted by the transmitting terminal device. FIG. 4 shows a schematic diagram of a process of HARQ feedback in a case that additional PSFCH resources are configured. In the example shown in FIG. 4, the TX UE transmits PSCCH and PSSCH in slot n, and the associated additional PSFCH resources are located also in the same slot, i.e., the slot n. In this way, the RX UE can perform the HARQ feedback in the slot n, without the need of waiting for configured pool-specific PSFCH resources in slot n+1. Thereby, real-time HARQ feedback is realized.

It is noted that for PSCCH and PSSCH data packets transmitted at a timing of the slot n+1 in FIG. 4, pool-specific PSFCH resources are configured by the system and additional PSFCH resources (located in the slot n+1) are also configured by the TX UE. At this time, the PSFCH resources configured by the system cannot meet the requirement on latency of the HARQ feedback, and thus the additional PSFCH resources configured by the TX UE will be used for the HARQ feedback. That is, in a case that both the additional PSFCH resources and the pool-specific PSFCH resources are available, the additional PSFCH resources are used preferentially for transmitting the HARQ feedback.

Figure 5:
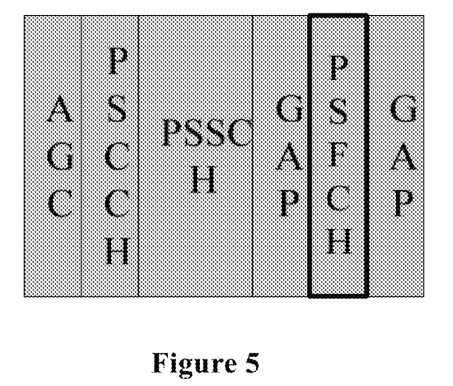
FIG. 5 shows a situation where additional PSFCH resources are the same as PSFCH resources in the frequency domain.

Furthermore, the additional PSFCH resources may be the same as the resources of the associated PSSCH transmitted by the transmitting terminal device in the frequency domain, or may be a part of the frequency-domain resources of the associated PSSCH. FIG. 4 shows a situation where the additional PSFCH resources are a part of the frequency-domain resources of the PSSCH. FIG. 5 shows a situation where the additional PSFCH resources are the same as the resources of the PSSCH in the frequency domain.

Figure 6:
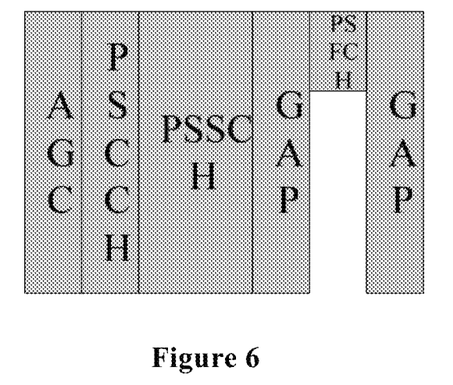
FIG. 6 shows an example of configuration of additional PSFCH resources.
Figure 7:
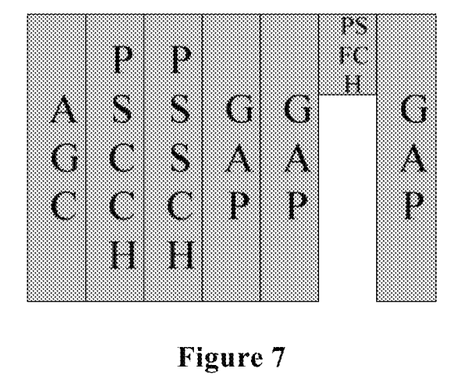
FIG. 7 shows another example of configuration of additional PSFCH resources.

There may be multiple patterns for the configuration of the additional PSFCH resources. For example, a pattern may refer to a time-frequency location of the additional PSFCH resources. FIG. 6 and FIG. 7 show examples of two patterns, respectively. In the example shown in FIG. 6, the additional PSFCH resources are spaced apart from a last Orthogonal Frequency Division Multiplexing (OFDM) symbol of the PSSCH by one OFDM symbol. In the example of FIG. 7, the additional PSFCH resources are spaced apart from a last OFDM symbol of the PSSCH by two OFDM symbols.

It should be understood that FIG. 6 and FIG. 7 only provide examples of the patterns of the additional PSFCH resources, which are not limiting, and other patterns may also be possible. For example, other patterns may be obtained by further changing, on the basis of the pattern shown in FIG. 6 or 7, the number of OFDM symbols occupied by the additional PSFCH resources, or the number of symbols spaced between the additional PSFCH resources and the last OFDM symbol of the PSSCH, or the like.

In order to notify the receiving terminal device of the configuration of the additional PSFCH resources, the providing unit 101 provides configuration information about the additional PSFCH resources to the receiving terminal device, so as to realize flexible configuration of the PSFCH resources specific to a terminal device or specific to a service. In this way, requirements on latency of various services may be satisfied while ensuring the spectrum efficiency.

For example, tie providing unit 101 may provide the above mentioned configuration information via one or more of the following: higher layer signaling such as PC5-RRC signaling, MAC CE, and lower layer signaling such as Sidelink Control Information (SCI).

The configuration information may include, for example, an indicator for whether configuring the additional PSFCH resources. In addition, the configuration information may further include pattern information. As described above, the pattern information is used to indicate a time-frequency location of the additional PSFCH resources, for example.

As an example, the configuration information may be provided via PC5-RRC signaling. The configuration information may have an explicit form, for example, an RRC signaling element may be added and declared separately. In a case that the configuration information includes only an indicator for whether configuring the additional PSFCH resources (e.g., having only one pattern), the RRC signaling element may have only one bit for indicating configuring the additional PSFCH resources or not configuring the additional PSFCH resources. In a case of multiple patterns, the RRC signaling element may have one or more bits, the number of which depends on the number of patterns.

Figure 8:
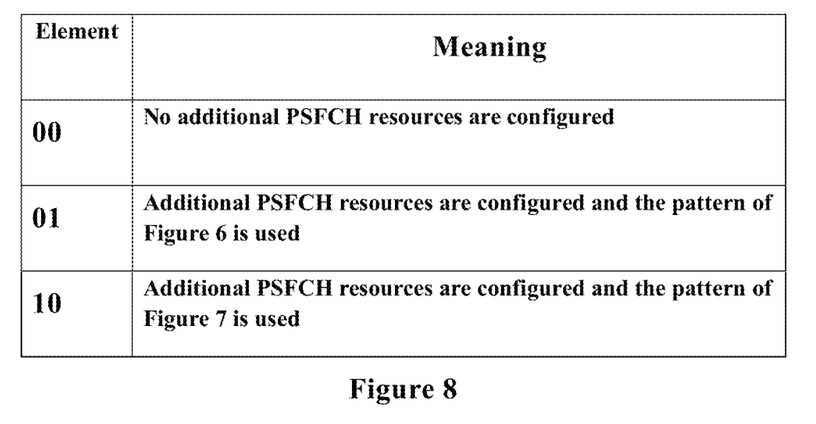
FIG. 8 shows an example of correspondence between a signaling element added in RRC and a pattern.

FIG. 8 shows an example of a correspondence between a signaling element added RRC and a pattern. The signaling element includes two bits. The signaling element 00 indicates that no additional PSFCH resources are configured; the signaling element 01 indicates that the additional PSFCH resources are configured and the pattern shown in FIG. 6 is used; and the signaling element 10 indicates that the additional PSFCH resources are configured and the pattern shown in FIG. 7 is used. In this example, configuring no additional PSFCH resources may be considered as one of the patterns.

It can be understood that if the configuration information includes only the pattern information and does not include the indicator for whether configuring the additional PSFCH resources, required number of bits may be further reduced. For example, in the example shown in FIG. 8, only 1 bit may be used to indicate which pattern is to be used.

On the other hand, in a case that the configuration information includes only the indicator for whether configuring the additional PSFCH resources, the configuration information (i.e., the indicator) may have an implicit form. For example, the indicator may be represented by a field indicating a timing relationship between the PSSCH and the HARQ Feedback. The timing relationship field, for example, indicates the latency between the PSSCH and the HARQ feedback. When the timing relationship field is set to indicate the latency of 0, it is represented that the additional PSFCH resources are configured; otherwise, it is represented that no additional PSFCH resources are configured.

As another example, the configuration information may be provided through SCI. Similarly, a domain may be added to the SCI for indicating the configuration information. The number of bits occupied by the domain depends on the number of patterns. Reference may be made to the correspondence scheme mentioned in the case of the RRC signaling for a correspondence between values of an element in the domain and the patterns. For example, in a case that the configuration information includes only an indicator for whether configuring the additional PSFCH resources, the added domain may occupy 1 bit, in a case that there are multiple patterns and the configuration information includes pattern information, the number of bits occupied by the added domain depends on the number of patterns, and configuring no additional PSFCH resources may be considered as one of the patterns.

As another example, in a case that the configuration information is provided through MAC CE, new MAC CE may be defined to represent the configuration information. A specific definition of the MAC CE may be similar to the definition of the newly added domain in SCI, and is not repeated here.

In summary, with the electronic apparatus 100 according to the embodiment, the additional PSFCH resources are configured for the HARQ feedback. Thereby, latency of the HARQ feedback can be significantly decreased and requirements on latency of services can be better satisfied.

Second Embodiment

Figure 9:
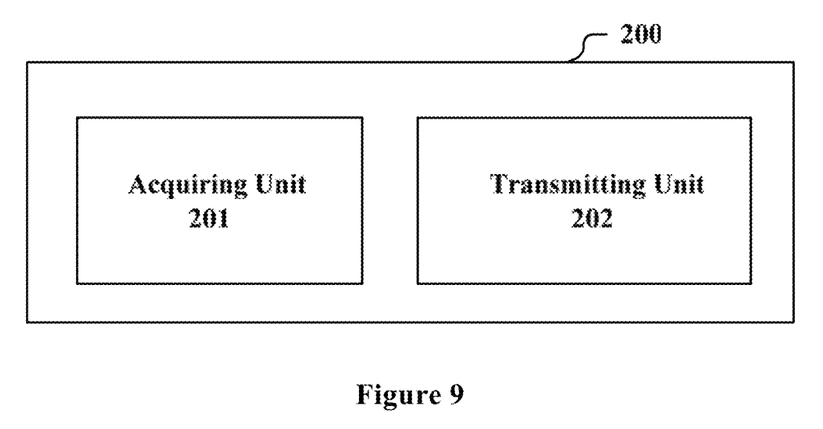
FIG. 9 shows a block diagram showing functional modules of an electronic apparatus for wireless communications according to another embodiment of the present disclosure.

FIG. 9 shows a block diagram showing functional modules of an electronic its apparatus 200 according to another embodiment of the present disclosure. As shown in FIG. 9, the electronic apparatus 200 includes an acquiring unit 201 and a transmitting unit 202. The acquiring unit 201 is configured to acquire configuration information from a transmitting terminal device in a sidelink communication. The configuration information is used for configuring additional physical sidelink feedback channel (PSFCH) resources for transmitting hybrid automatic retransmission request (HARQ) feedback by a receiving terminal device. The additional PSFCH resources are resources other than pool-specific PSFCH resources which are already configured. The transmitting unit 202 is configured to transmit, based on the configuration information, the HARQ feedback to the transmitting terminal device.

The acquiring unit 201 and the transmitting unit 202 may be implemented by one or more processing circuitries. The processing circuitries may be implemented as, for example, a chip. Moreover, it should be understood that various functional units in the apparatus shown in FIG. 9 are only logical modules divided based on their specific functions, and are not intended to limit a specific implementation.

The electronic apparatus 200 may be arranged on a side of the receiving terminal device or may be communicatively connected to the receiving terminal device, for example. Here, it should be noted that the electronic apparatus 200 may be implemented in a chip level, or in an apparatus level. For example, the electronic apparatus 200 may operate as the terminal device itself, and may further include external devices such as a memory and a transceiver (not shown). The memory may be configured to store programs required to be executed by the terminal device to implement various functions, and related data information. The transceiver may include one or more communication interfaces to support communications with various devices (a base station, other terminal devices, and the like), and implementations of the transceiver are not particularly limited herein.

Similarly, the terminal device may be UE, a relay network node, or the like.

For example, additional PSFCH resources may be located within a same time slot in a time domain as resources of associated PSSCH transmitted by the transmitting terminal device. Referring back to FIG. 4, for example, the TX UE transmits PSCCH and PSSCH in the time slot n, and the associated additional PSFCH resources are located also in the same time slot, i.e., the time slot n. In this way, the RX UE may perform HARQ feedback in the slot n without need of waiting for configured pool-specific PSFCH resources in the slot n+1. Hence, real-time HARQ feedback is realized.

Furthermore, the additional PSFCH resources may be the same as the resources of associated PSSCH transmitted by the transmitting terminal device in the frequency domain, or may be a part of frequency-domain resources of the associated PSSCH. For example, FIG. 4 shows a situation where the additional PSFCH resources are a part of the frequency domain resources of the PSSCH; and FIG. 5 shows a situation where the additional PSFCH resources are the same as the resources of the PSSCH in the frequency domain.

There may be multiple patterns for a configuration of the additional PSFCH resources. For example, a pattern may refer to a time-frequency location of the additional PSFCH resources. The additional PSFCH resources may be spaced apart from a last Orthogonal Frequency Division Multiplexing (OFDM) symbol of the PSSCH by one OFDM symbol (as shown in FIG. 6) or two OFDM symbols (as shown in FIG. 7). The patterns are described in detail in the first embodiment and are not repeated here.

In order to enable the receiving terminal device to be aware of the location of the additional PSFCH resources and use the resources to transmit the HARQ feedback, the receiving terminal device is required to acquire, from the transmitting terminal device, configuration information of the additional PSFCH resources. In this way, flexible configuration for the PSFCH resources specific to a terminal device or specific to a service may be implemented, so that requirements on latency of various services may be satisfied while ensuring the spectrum efficiency.

For example, the acquiring unit 201 may acquire the above mentioned configuration information via one or more of the following: high layer signaling such as PC5-RRC signaling, MAC CE, and lower layer signaling such as Sidelink Control Information (SCI).

The configuration information may include, for example, an indicator for whether configuring the additional PSFCH resources. In addition, the configuration information may further include pattern information. The pattern information is used to indicate a time-frequency location of the additional PSFCH resources, for example.

As an example, the configuration information may be acquired via PC5-RRC signaling. The configuration information may have an explicit form, for example, an RRC signaling element may be added and declared separately. In a case that the configuration information includes only an indicator for whether configuring the additional PSFCH resources (e.g., having only one pattern), the RRC signaling element may have only one bit for indicating configuring the additional PSFCH resources or not configuring the additional PSFCH resources. In a case of multiple patterns, the RRC signaling element may have one or more bits, the number of which depends on the number of patterns.

On the other hand, in a case that the configuration information includes only the indicator for whether configuring the additional PSFCH resources, the configuration information (i.e., the above mentioned indicator) may have an implicit form. For example, the indicator may be represented by a field indicating a timing relationship between the PSSCH and the HARQ Feedback. The timing relationship field, for example, indicates the latency between the PSSCH and the HARQ feedback. When the timing relationship field is set to indicate the latency of 0, it is represented that the additional PSFCH resources are configured; otherwise, it is represented that no additional PSFCH resources are configured. Reference may still be made to FIG. 8 for specific examples.

As another example, the configuration information may be acquired through SCI. Similarly, a domain may be added to the SCI for indicating the configuration information. The number of bits occupied by the domain depends on the number of patterns. Reference may be made to the correspondence scheme mentioned in the case of the RRC signaling for a correspondence between values of an element in the domain and the patterns. For example, in a case that the configuration information includes only an indicator for whether configuring the additional PSFCH resources, the added domain may occupy 1 bit; in a case that there are multiple patterns and the configuration information includes pattern information, the number of bits occupied by the added domain depends on the number of patterns, and configuring no additional PSFCH resources may be considered as one of the patterns.

As another example, the configuration information may be acquired through MAC CE. In such case, new MAC CE is defined to represent the configuration information. A specific definition of the MAC CE may be similar to the definition of the newly added domain in SCI, and is not repeated here.

In addition, in a case that both the additional PSFCH resources and the pool-specific PSFCH resources are available, the transmitting unit 202 preferentially uses the additional PSFCH resources to transmit the HARQ feedback. In this way, requirements on latency of the HARQ feedback of services may be better satisfied.

In summary, with the electronic apparatus 200 according to this embodiment, the additional PSFCH resources are used for the HARQ feedback. Thereby, latency of the HARQ feedback can be significantly decreased and requirements on latency of services can be better satisfied.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 10:
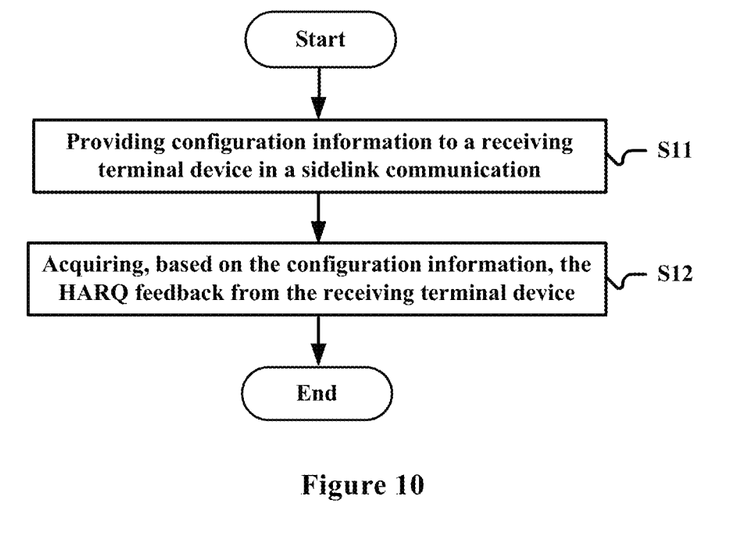
FIG. 10 shows a flowchart of a method for wireless communications according to an embodiment of the present disclosure.

FIG. 10 shows a flowchart of a method for wireless communications according to an embodiment of the present disclosure. The method includes: providing configuration information to a receiving terminal device in a sidelink communication, the configuration information being used for configuring additional PSFCH resources for transmitting HARQ feedback by the receiving terminal device (S11), wherein the additional PSFCH resources are resources other than pool-specific PSFCH resources which are already configured; and acquiring, based on the configuration information, the HARQ feedback from the receiving terminal device (S12). The method may be implemented, for example, on a side of the transmitting terminal device.

For example, the configuration information may be provided via one or more of the following: PC5-RRC signaling, MAC CE, sidelink control information (SCI).

The configuration information may include an indicator for whether configuring the additional PSFCH resources. In addition/alternatively, the configuration information may include pattern information for indicating a time-frequency location of the additional PSFCH resources.

For example, the indicator may be represented by a field indicating a timing relationship between PSSCH and the HARQ Feedback. For example, when the field indicating a timing relationship between the PSSCH and the HARQ feedback indicates a latency of 0, it is represented that the additional PSFCH resources are configured.

For example, the additional PSFCH resources are located within a same time slot in a time domain as resources of associated PSSCH transmitted by the transmitting terminal device. Exemplarily, the additional PSSCH resources are spaced apart from a last OFDM symbol of the PSSCH by one or two OFDM symbols. The additional PSFCH resources are the same as the resources of the associated PSSCH transmitted by the transmitting terminal device in the frequency domain, or are a part of frequency-domain resources of the associated PSSCH.

Figure 11:
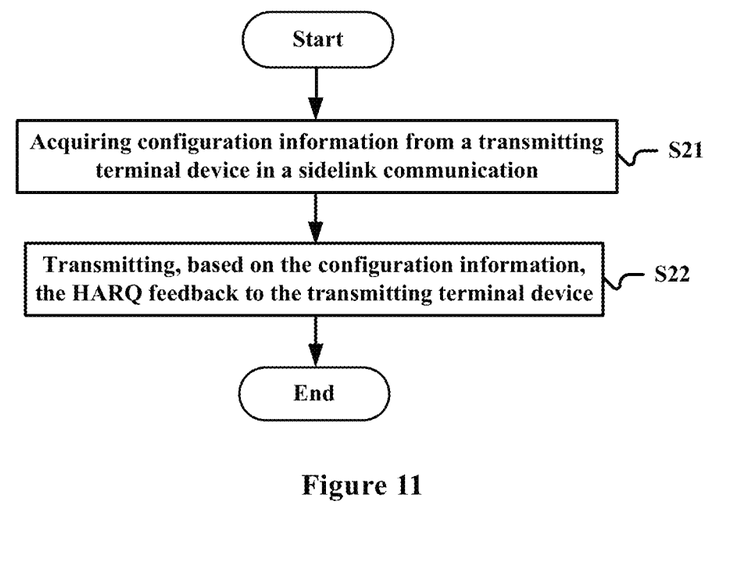
FIG. 11 shows a flowchart of a method for wireless communications according to another embodiment of the present disclosure.

FIG. 11 shows a flowchart of a method for wireless communications according to another embodiment of the present disclosure. The method includes: acquiring configuration information from a transmitting terminal device in a sidelink communication, the configuration information being used for configuring additional PSFCH resources for a transmitting HARQ feedback by a receiving terminal device (S21), wherein the additional PSFCH resources are resources other than pool-specific PSFCH resources which are already configured; and transmitting, based on the configuration information, the HARQ feedback to the transmitting terminal device (S22). The method may be performed, for example, on a side of the receiving terminal device.

For example, the configuration information may be acquired via one or more of the following: PC5-RRC signaling, MAC CE, and sidelink control information (SCI).

Similarly, the configuration information may include an indicator for whether configuring the additional PSFCH resources. In addition/alternatively, the configuration information may include pattern information indicating a time-frequency location of the additional PSFCH resources.

For example, the indicator may be represented by a field indicating a timing relationship between PSSCH and the HARQ Feedback. For example, when the field indicating a timing relationship between the PSSCH and the HARQ feedback indicates a latency of 0, it is represented that the additional PSFCH resources are configured.

For example, the additional PSFCH resources are located within a same time slot in a time domain as resources of associated PSSCH transmitted by the transmitting terminal device. Exemplarily, the additional PSFCH resources are spaced apart from a last OFDM symbol of the PSSCH by one or two OFDM symbols. The additional PSFCH resources are the same as the resources of the associated PSSCH transmitted by the transmitting terminal device in the frequency domain, or are a part of the frequency-domain resources of the associated PSSCH.

Furthermore, in a case that both the additional PSFCH resources and the pool-specific PSFCH resources are available, the additional PSFCH resources may be preferentially used to transmit the HARQ feedback.

The above methods correspond to the electronic apparatus 100 described in the first embodiment and the electronic apparatus 200 described in the second embodiment, respectively. Reference may be made to corresponding descriptions above for specific details, and are not repeated here. Note that the methods may be used in combination or individually.

The technology of the present disclosure is applicable to various products.

For example, the electronic apparatus 100 and the electronic apparatus 200 may be implemented as various types of user equipment. The user equipment may be implemented as a mobile terminal (such as a smartphone, a tablet personal computer (PC), a notebook PC, a portable game terminal, a portable/dongle type mobile router, and a digital camera), or an in-vehicle terminal (such as a car navigation device). The user equipment may also be implemented as a terminal (that is also referred to as a machine type communication (MTC) terminal) that performs machine-to-machine (M2M) communication. Furthermore, the user equipment may be a wireless communication module (such as an integrated circuit module including a single die) mounted on each of the terminals.

Application Examples Regarding User Equipment

First Application Example

Figure 12:
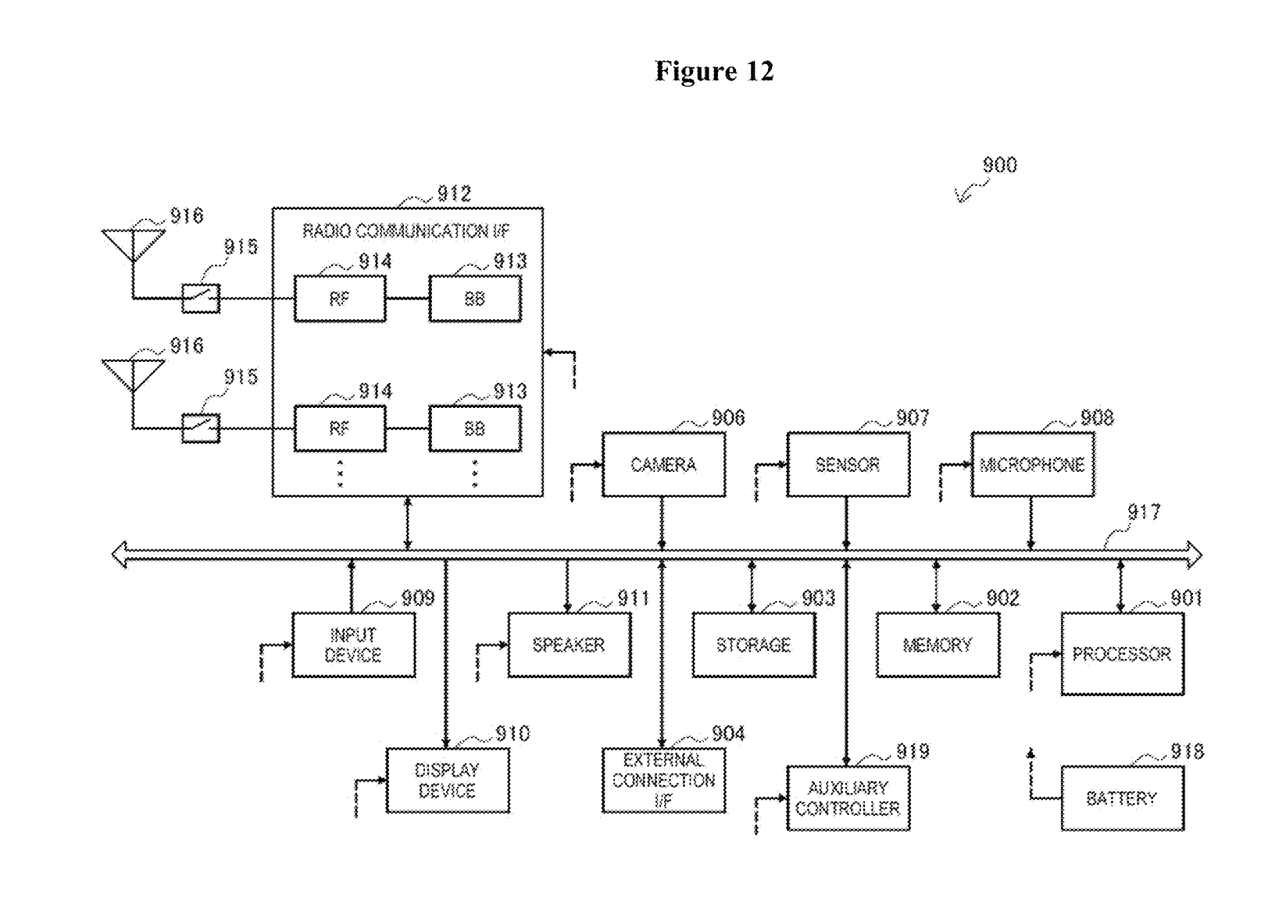
FIG. 12 is a block diagram showing an example of an exemplary configuration of a smartphone to which the technology according to the present disclosure may be applied.

FIG. 12 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals outputted from the smartphone 900 to sounds.

The radio communication interface 912 supports any cellular communication scheme (such as LTE and LTE-advanced), and performs wireless communications. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 12 shows a case that one RF link is connected to one antenna which is only illustrative, and a situation where one RF link is connected to multiple antennas through multiple phase shifters is also possible. The radio communication interface 912 may be a chip module having the BB processor 913 and the RF circuit 914 integrated thereon. The radio communication interface 912 may include multiple BB processors 913 and multiple RF circuits 914, as shown in FIG. 12. Although FIG. 12 shows the example in which the radio communication interface 912 includes multiple BB processors 913 and multiple RF circuits 914, the radio communication interface 912 may include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a wireless local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 12. Although FIG. 12 shows the example in which the smartphone 900 includes multiple antennas 916, the smartphone 900 may include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 shown in FIG. 12 via feeder lines, which are partially shown as dashed lines in FIG. 12. The auxiliary controller 919 operates a minimum necessary function of the smartphone 900, for example, in a sleep mode.

In the smartphone 900 shown in FIG. 12, the providing unit 101, the acquiring unit 102 and a transceiver of the electronic apparatus 100 may be implemented by the radio communication interface 912, and the acquiring unit 201, the transmitting unit 202 and a transceiver of the electronic apparatus 200 may be implemented by the radio communication interface 912. At least a part of the functions may also be implemented by the processor 901 or the auxiliary controller 919. For example, the processor 901 or the auxiliary controller 919 may implement the HARQ feedback on the additional PSFCH resources by implementing the functions of the providing unit 101 and the acquiring unit 102 or the functions of the acquiring unit 201 and the transmitting unit 202. Thereby, latency of the HARQ feedback is reduced, and requirements on latency of various services are satisfied.

Second Application Example

Figure 13:
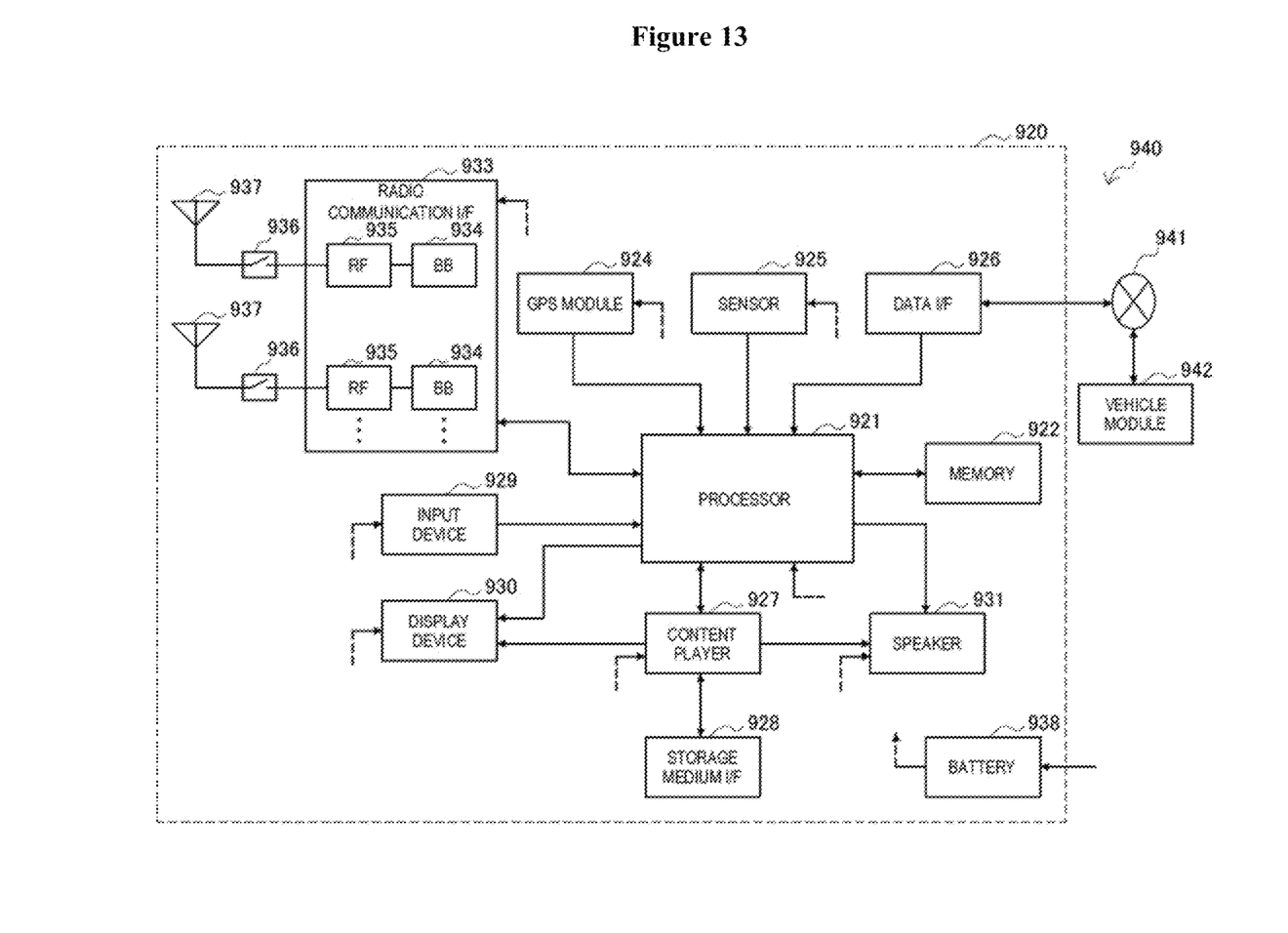
FIG. 13 is a block diagram showing an example of an exemplary configuration of a car navigation apparatus to which the technology according to the present disclosure may be applied.

FIG. 13 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or reproduced content. The speaker 931 outputs a sound for the navigation function or the reproduced content.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 13. Although FIG. 13 shows the example in which the radio communication interface 933 includes multiple BB processors 934 and multiple RF circuits 935, the radio communication interface 933 may include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits fix different wireless communication schemes) included in the radio communication interface 933.

Each of the antennas 937 includes a single or multiple antenna elements (such as multiple antenna elements included in an MEW antenna), and is used for the radio communication interface 933 to transmit and receive wireless signals. As shown in FIG. 13, the car navigation apparatus 920 may include multiple antennas 937. Although FIG. 13 shows the example in which the car navigation apparatus 920 includes multiple antennas 937, the car navigation apparatus 920 may include a single antenna 937.

Furthermore, the car navigation apparatus 920 may include the antenna 937 for each wireless communication scheme. In this case, the antenna switches 936 may be omitted from the configuration of the car navigation apparatus 920.

Figure 14:
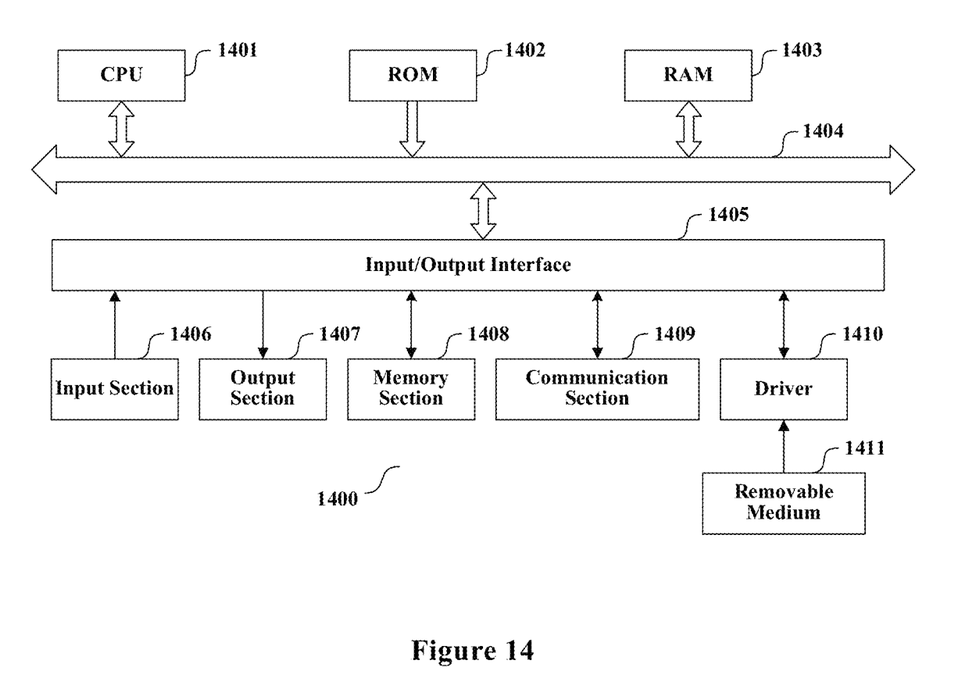
FIG. 14 is a block diagram of an exemplary block diagram illustrating the structure of a general purpose personal computer capable of realizing the method and/or device and/or system according to the embodiments of the present disclosure.

The battery 938 supplies power to the blocks of the car navigation apparatus 920 shown in FIG. 13 via feeder lines that are partially shown as dash lines in FIG. 14. The battery 938 accumulates power supplied from the vehicle.

In the car navigation device 920 shown in FIG. 13, the providing unit 101, the acquiring unit 102 and the transceiver of the electronic apparatus 100 may be implemented by the radio communication interface 933, and the acquiring unit 201, the transmitting unit 202 and the transceiver of the electronic apparatus 200 may be implemented by the radio communication interface 933. At least a part of the functions may also be implemented by the processor 921. For example, the processor 921 may implement the HARQ feedback on the additional PSFCH resources by implementing the functions of the providing unit 101 and the acquiring unit 102 or the functions of the acquiring unit 201 and the transmitting unit 202. Thereby, latency of the HARQ feedback is reduced, and requirements on latency of various services are satisfied.

The technology according to the present disclosure may also be implemented as an in-vehicle system (or a vehicle) 940 including one or more blocks of the car navigation device 920, the in-vehicle network 941, and a vehicle module 942. The vehicle module 942 generates vehicle data (such as vehicle speed, engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1400 shown in FIG. 14) from a storage medium or network, wherein the computer is capable of implementing various functions when installed with various programs.

In FIG. 14, a central processing unit (CPU) 1401 executes various processing according to a program stored in a read-only memory (ROM) 1402 or a program loaded to a random access memory (RAM) 1403 from a memory section 1408. The data needed for the various processing of the CPU 1401 may be stored in the RAM 1403 as needed. The CPU 1401, the ROM 1402 and the RAM 1403 are linked with each other via a bus 1404. An input/output interface 1405 is also linked to the bus 1404.

The following components are linked to the input/output interface 1405; an input section 1406 (including keyboard, mouse and the like), an output section 1407 (including displays such as a cathode ray tube (CRT), a liquid crystal display (LCD), a loudspeaker and the like), a memory section 1408 (including hard disc and the like), and a communication section 1409 (including a network interface card such as a LAN card, modem and the like). The communication section 1409 performs communication processing via a network such as the Internet. A driver 1410 may also be linked to the input/output interface 1405, if needed. If needed, a removable medium 1411, for example, a magnetic disc, an optical disc, a magnetic optical disc, a semiconductor memory and the like, may be installed in the driver 1410, so that the computer program read therefrom is installed in the memory section 1408 as appropriate.

In the case where the foregoing series of processing is achieved through software, programs forming the software are installed from a network such as the Internet or a memory medium such as the removable medium 1411.

It should be appreciated by those skilled in the art that the memory medium is not limited to the removable medium 1411 shown in FIG. 14, which has program stored therein and is distributed separately from the apparatus so as to provide the programs to users. The removable medium 1411 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1402 and the memory section 1408 in which programs are stored, and can be distributed to users along with the device in which they are incorporated.

To be further noted, in the apparatus, method and system according to the present disclosure, the respective components or steps can be decomposed and/or recombined. These decompositions and/or re-combinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry configured to:
   acquire, via system control, first configuration information related to pool-specific physical sidelink feedback channel (PSFCH) resources to be used by the electronic apparatus and a receiving terminal device to exchange hybrid automatic retransmission request (HARQ) feedback in a sidelink communication between the electronic apparatus and the receiving terminal device,
   provide second configuration information to the receiving terminal device via the sidelink communication, the second configuration information to be used by the receiving terminal device to configure additional PSFCH resources, other than the pool-specific PSFCH resources, the additional PSFCH resources selected by the electronic apparatus for use by the receiving terminal device to transmit the HARQ feedback to the electronic apparatus,
   wherein the additional PSFCH resources selected by the electronic apparatus have a lower latency than the pool-specific PSFCH resources,
   transmit information to a receiving terminal device via the sidelink communication, and
   acquire, based on one of the first or second configuration information, HARQ feedback relative to the transmitted information from the receiving terminal device via the pool-specific PSFCH resources or the additional PSFCH resources,
   wherein the additional PSFCH resources are preferentially used for the HARQ feedback.

2. The electronic apparatus according to claim 1, wherein the processing circuitry is configured to provide the second configuration information to the receiving terminal device via one or more of the following: PC5-RRC signaling, MAC CE, or sidelink control information (SCI).

3. The electronic apparatus according to claim 1, wherein the second configuration information comprises an indicator that indicates whether the additional PSFCH resources are configured.

4. The electronic apparatus according to claim 3, wherein the indicator is represented by a field indicating a timing relationship between a Physical Sidelink Shared Channel (PSSCH) and the HARQ feedback.

5. The electronic apparatus according to claim 4, wherein, based on the field indicating the timing relationship between the PSSCH and the HARQ feedback indicates a latency of 0, the field represents that the additional PSFCH resources are configured.

6. The electronic apparatus according to claim 1, wherein the second configuration information comprises pattern information which indicates a time-frequency location of the additional PSFCH resources.

7. The electronic apparatus according to claim 1, wherein the additional PSFCH resources are located within a same time slot as resources assigned to the electronic apparatus for transmission of an associated Physical Sidelink Shared Channel (PSSCH) to the receiving terminal device.

8. The electronic apparatus according to claim 7, wherein the additional PSFCH resources are spaced apart from a last Orthogonal Frequency Division Multiplexing (OFDM) symbol of the PSSCH by one or two OFDM symbols.

9. The electronic apparatus according to claim 1, wherein the additional PSFCH resources are the same as resources of assigned to the electronic apparatus for transmission of an associated Physical Sidelink Shared Channel (PSSCH) to the receiving terminal device in a frequency domain, or are a part of frequency domain resources of the associated PSSCH.

10. The electronic apparatus according to claim 1, wherein, in K logically contiguous time slots, the information is transmitted in a first time slot of the K logically contiguous time slots, the pool-specific PSFCH resources are located in a first-plus-Kth time slot of the K logically contiguous time slots, and the additional PSFCH resources are located in at least one of the first time slot or a second time slot of the K logically contiguous time slots, where K is an integer greater or equal to 3.

11. The electronic apparatus according to claim 1, wherein the additional PSFCH resources selected by the electronic apparatus for use by the receiving terminal device to transmit the HARQ feedback to the electronic apparatus are resources initially assigned to the electronic apparatus for use by the electronic apparatus for transmitting an associated Physical Sidelink Shared Channel (PSSCH) to the receiving terminal device.

12. An electronic apparatus for wireless communications, comprising:
   processing circuitry configured to:
   acquire, via system control, first configuration information related to pool-specific physical sidelink feedback channel (PSFCH) resources to be used by the electronic apparatus and a transmitting terminal device to exchange hybrid automatic retransmission request (HARQ) feedback in a sidelink communication between the electronic apparatus and the transmitting terminal device,
   acquire second configuration information from the transmitting terminal device via the sidelink communication, the second configuration information to be used by the electronic apparatus to configure additional PSFCH resources, other than the pool-specific PSFCH resources, the additional PSFCH resources selected by the transmitting terminal device for use by the electronic apparatus to transmit the HARQ feedback to the electronic apparatus,
   wherein the additional PSFCH resources selected by the transmitting terminal device have a lower latency than the pool-specific PSFCH resources,
   receive information from the transmitting terminal device via the sidelink communication, and
   transmit, based on one of the first or second configuration information, HARQ feedback relative to the transmitted information to the transmitting terminal device via the pool-specific PSFCH resources or the additional PSFCH resources, wherein the additional PSFCH resources are preferentially used for the HARQ feedback.

13. The electronic apparatus according to claim 12, wherein, the processing circuitry is configured to acquire the second configuration information from the transmitting terminal device via one or more of the following: PC5-RRC signaling, MAC CE, or sidelink control information (SCI).

14. The electronic apparatus according to claim 12, wherein the second configuration information comprises an indicator that indicates whether the additional PSFCH resources are configured.

15. The electronic apparatus according to claim 14, wherein the indicator is represented by a field indicating a timing relationship between a Physical Sidelink Shared Channel (PSSCH) and the HARQ feedback.

16. The electronic apparatus according to claim 15, wherein, based on the field indicating the timing relationship between the PSSCH and the HARQ feedback indicates a latency of 0, the field represents that the additional PSFCH resources are configured.

17. The electronic apparatus according to claim 12, wherein the second configuration information comprises pattern information which indicates a time-frequency location of the additional PSFCH resources.

18. The electronic apparatus according to claim 12, wherein the additional PSFCH resources are located within a same time slot as resources of assigned to the transmitting terminal device for transmission of an associated Physical Sidelink Shared Channel (PSSCH) to the electronic apparatus.

19. The electronic apparatus according to claim 18, wherein the additional PSFCH resources are spaced apart from a last Orthogonal Frequency Division Multiplexing (OFDM) symbol of the PSSCH by one or two OFDM symbols.

20. The electronic apparatus according to claim 12, wherein the additional PSFCH resources are the same as resources of assigned to the transmitting terminal device for transmission of an associated Physical Sidelink Shared Channel (PSSCH) to the electronic apparatus in a frequency domain, or are a part of frequency domain resources of the associated PSSCH.

21. The electronic apparatus according to claim 12, wherein, in K logically contiguous time slots, the information is transmitted in a first time slot of the K logically contiguous time slots, the pool-specific PSFCH resources are located in a first-plus-Kth time slot of the K logically contiguous time slots, and the additional PSFCH resources are located in at least one of the first time slot or a second time slot of the K logically contiguous time slots, where K is an integer greater or equal to 3.

22. The electronic apparatus according to claim 12, wherein the additional PSFCH resources selected by the transmitting terminal device for use by the electronic apparatus to transmit the HARQ feedback to the transmitting terminal device are resources initially assigned to the transmitting terminal device for use by the transmitting terminal device for transmitting an associated Physical Sidelink Shared Channel (PSSCH) to the electronic apparatus.

23. A method for wireless communications performed by an electronic apparatus, the method comprising:
acquiring, via system control, first configuration information related to pool-specific physical sidelink feedback channel (PSFCH) resources to be used by the electronic apparatus and a receiving terminal device to exchange hybrid automatic retransmission request (HARQ) feedback in a sidelink communication between the electronic apparatus and the receiving terminal device,
providing, by the electronic apparatus, second configuration information to the receiving terminal device via the sidelink communication, the second configuration information to be used by the receiving terminal device to configure additional PSFCH resources, other than the pool-specific PSFCH resources, the additional PSFCH resources selected by the electronic apparatus for use by the receiving terminal device to transmit the HARQ feedback to the electronic apparatus,
wherein the additional PSFCH resources selected by the electronic apparatus have a lower latency than the pool-specific PSFCH resources, transmitting information to a receiving terminal device via the sidelink communication, and
acquiring, based on one of the first or second configuration information, HARQ feedback relative to the transmitted information from the receiving terminal device via the pool-specific PSFCH resources or the additional PSFCH resources,
wherein the additional PSFCH resources are preferentially used for the HARQ feedback.

24. The method according to claim 23, wherein, in K logically contiguous time slots, the information is transmitted in a first time slot of the K logically contiguous time slots, the pool-specific PSFCH resources are located in a first-plus-Kth time slot of the K logically contiguous time slots, and the additional PSFCH resources are located in at least one of the first time slot or a second time slot of the K logically contiguous time slots, where K is an integer greater or equal to 3.

25. The method according to claim 23, wherein the additional PSFCH resources selected by the electronic apparatus for use by the receiving terminal device to transmit the HARQ feedback to the electronic apparatus are resources initially assigned to the electronic apparatus for use by the electronic apparatus for transmitting an associated Physical Sidelink Shared Channel (PSSCH) to the receiving terminal device.

* * * * *